United States Patent
LeBlanc

(10) Patent No.: US 8,235,648 B2
(45) Date of Patent: Aug. 7, 2012

(54) DIFFUSER WITH ENHANCED SURGE MARGIN

(75) Inventor: Andre LeBlanc, Saint-Bruno (CA)

(73) Assignee: Pratt & Whitney Canada Corp., Longueuil (CA)

( * ) Notice: Subject to any disclaimer, the term of this patent is extended or adjusted under 35 U.S.C. 154(b) by 747 days.

(21) Appl. No.: 12/239,264

(22) Filed: Sep. 26, 2008

(65) Prior Publication Data
US 2010/0077768 A1  Apr. 1, 2010

(51) Int. Cl.
*F02C 6/08* (2006.01)
*F01D 1/06* (2006.01)
*F04D 27/02* (2006.01)

(52) U.S. Cl. .................. 415/58.4; 415/57.1; 60/785

(58) Field of Classification Search .............. 415/57.1, 415/57.4, 58.4, 115, 204, 208.2, 208.3, 224.5; 60/785
See application file for complete search history.

(56) References Cited

U.S. PATENT DOCUMENTS

| | | |
|---|---|---|
| 1,662,249 A | 3/1928 | Jennings |
| 3,006,145 A | 10/1961 | Sobey |
| 3,333,762 A | 8/1967 | Vrana |
| 3,420,435 A | 1/1969 | Jarosz et al. |
| 3,613,360 A | 10/1971 | Howes |
| 3,652,176 A | 3/1972 | Walsh |
| 3,706,510 A | 12/1972 | O'Connor |
| 3,768,919 A | 10/1973 | O'Connor |
| 3,832,089 A | 8/1974 | Moellmann |
| 3,935,034 A | 1/1976 | Hayes |
| 3,964,837 A | 6/1976 | Exley |
| 3,971,218 A | 7/1976 | Toth, Jr. et al. |
| 4,054,398 A | 10/1977 | Penny |
| 4,131,389 A * | 12/1978 | Perrone et al. ............. 415/208.3 |
| 4,164,845 A * | 8/1979 | Exley et al. ................... 60/795 |
| 4,212,585 A | 7/1980 | Swarden et al. |
| 4,264,271 A | 4/1981 | Libertini |
| 4,308,718 A | 1/1982 | Mowill |
| 4,315,714 A | 2/1982 | Exley et al. |
| 4,368,005 A | 1/1983 | Exley et al. |
| 4,402,764 A | 9/1983 | Clark et al. |
| 4,445,816 A | 5/1984 | Ribaud et al. |

(Continued)

FOREIGN PATENT DOCUMENTS

FR  1603204  3/1971

(Continued)

OTHER PUBLICATIONS

Patent Abstracts of Japan; JP01257797; Kawasaki Heavy Ind. Ltd.; Oct. 13, 1989.

*Primary Examiner* — Benjamin Sandvik
*Assistant Examiner* — Joseph Schoenholtz
(74) *Attorney, Agent, or Firm* — Norton Rose Canada LLP

(57) ABSTRACT

A diffuser for a centrifugal impeller assembly of a gas turbine engine includes a diffuser case having a plurality of vanes extending therein defining a plurality of circumferentially distributed angled passages in communication with an inlet space. Each vane includes a bleed port defined in a suction surface thereof, in proximity of the leading edge. The diffuser case includes a passive fluid communication defined at least partially through each one of the vanes between each bleed port and the inlet space upstream of the leading edge, such that air bled through the bleed ports is recirculated upstream of the leading edges to the inlet space to increase a surge margin of the diffuser.

8 Claims, 3 Drawing Sheets

U.S. PATENT DOCUMENTS

| | | | |
|---|---|---|---|
| 4,576,550 | A | 3/1986 | Bryans |
| 4,687,412 | A | 8/1987 | Chamberlain |
| 4,740,138 | A | 4/1988 | Zaehring et al. |
| 4,832,993 | A | 5/1989 | Coulon |
| 4,919,773 | A | 4/1990 | Naik |
| 5,064,691 | A | 11/1991 | Kirner et al. |
| 5,252,027 | A | 10/1993 | Brasz |
| 5,372,477 | A | 12/1994 | Cole |
| 5,427,498 | A | 6/1995 | Lehe et al. |
| 5,478,200 | A | 12/1995 | Brodersen et al. |
| 5,564,898 | A | 10/1996 | Richards et al. |
| 5,601,406 | A | 2/1997 | Chan et al. |
| 5,618,162 | A | 4/1997 | Chan et al. |
| 5,876,572 | A | 3/1999 | Rickerby et al. |
| 6,155,777 | A | 12/2000 | Aschenbruck et al. |
| 6,166,462 | A | 12/2000 | Finkenbinder et al. |
| 6,209,312 | B1 | 4/2001 | Singer et al. |
| 6,210,104 | B1 | 4/2001 | Schönenborn |
| 6,220,816 | B1 | 4/2001 | Nguyen Duc et al. |
| 6,224,321 | B1 | 5/2001 | Ebden et al. |
| 6,471,475 | B1 | 10/2002 | Sasu et al. |
| 6,478,887 | B1 | 11/2002 | Sue et al. |
| 6,589,015 | B1 | 7/2003 | Roberts et al. |
| 6,605,160 | B2 | 8/2003 | Hoskin |
| 6,695,579 | B2 | 2/2004 | Meng |
| 6,706,319 | B2 | 3/2004 | Seth et al. |
| 6,797,335 | B1 | 9/2004 | Paderov et al. |
| 2002/0114693 | A1 | 8/2002 | Bartholoma et al. |
| 2005/0118019 | A1 | 6/2005 | Roberts et al. |

FOREIGN PATENT DOCUMENTS

| | | |
|---|---|---|
| GB | 170815 | 10/1921 |
| WO | WO-0034628 | 6/2000 |
| WO | WO-0206676 | 1/2002 |

* cited by examiner

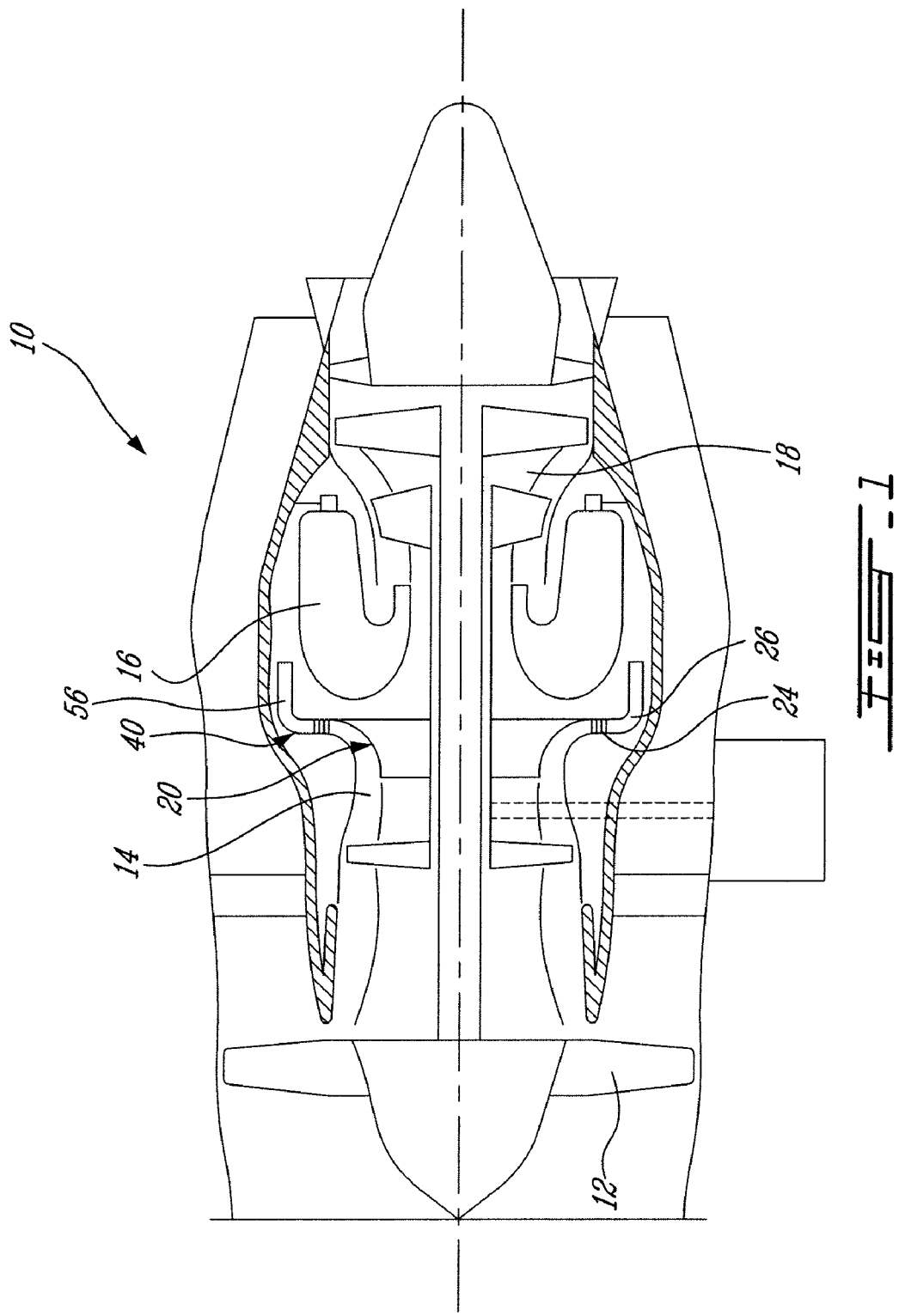

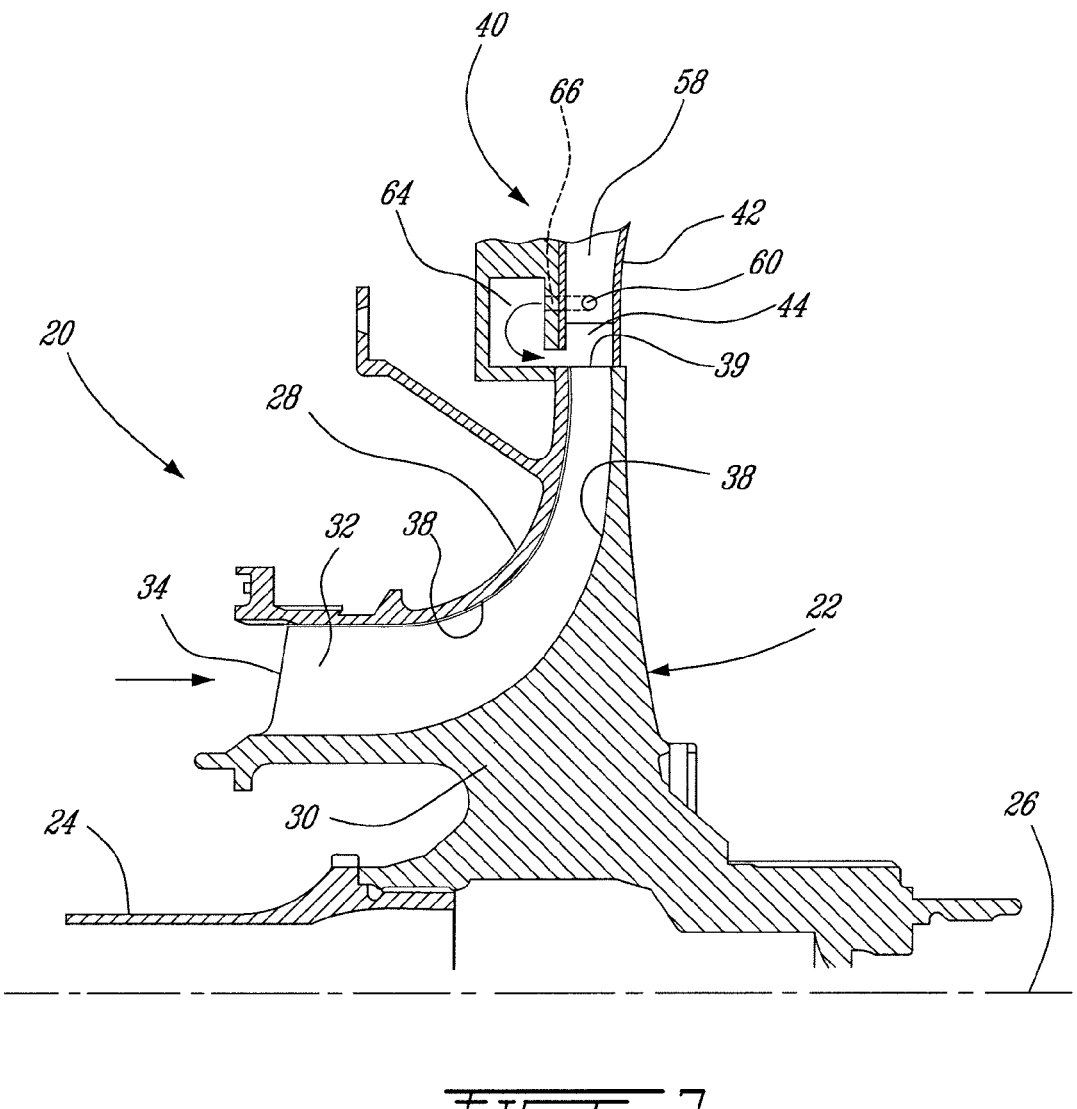

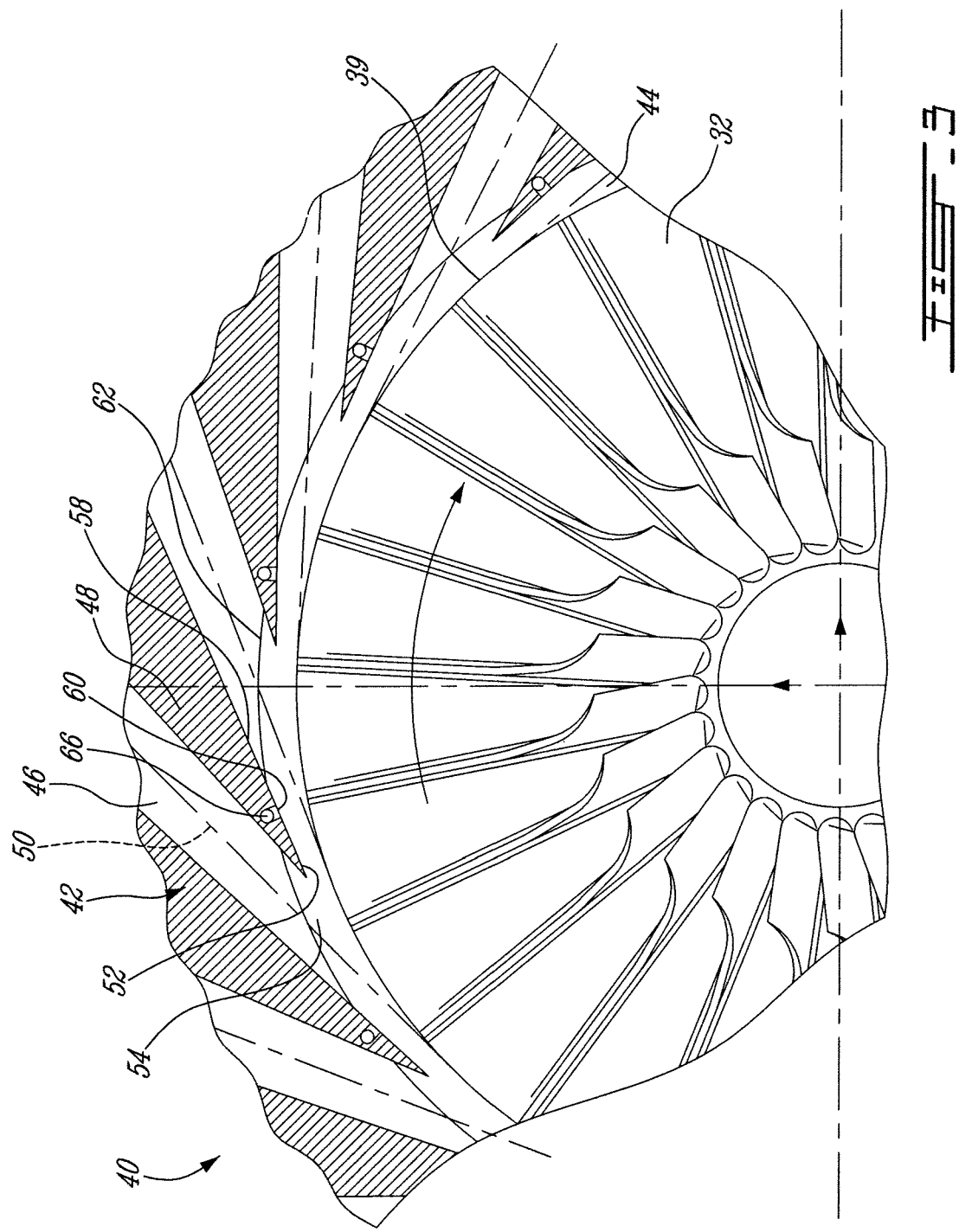

DIFFUSER WITH ENHANCED SURGE MARGIN

TECHNICAL FIELD

The field relates generally to a diffuser of a centrifugal compressor for a gas turbine engine and, more particularly, to a diffuser having an enhanced surge margin.

BACKGROUND OF THE ART

Centrifugal compressors generally consist of at least two main components: an impeller and a diffuser. As the fluid flowing from the impeller of the compressor to the diffuser is reduced, the incidence of the flow on the diffuser vanes and the static pressure within the diffuser passages increases, until stall eventually results within the passages, followed by stage "surge". Surge of the compressor is a well know problem, and therefore many means for controlling and/or delaying the onset of surge have been attempted in the past, however none have been found to be ideal. As such, there continues to be a need for improvement in this regard.

SUMMARY

In one aspect, there is provided a diffuser for a centrifugal impeller assembly of a gas turbine engine, the diffuser comprising a diffuser case defining a circumferentially extending inlet space surrounding the impeller, the diffuser case having a plurality of vanes extending therein defining a plurality of circumferentially distributed angled passages therebetween, the passages being in communication with the inlet space, each vane including a respective leading edge adjacent to or located in the inlet space, each vane having a corresponding bleed port defined in a suction surface thereof in proximity of the respective leading edge, the diffuser case including a passive fluid communication defined at least partially through each vane between the corresponding bleed port and the inlet space upstream of the leading edges, such that air bled from each passage downstream of the leading edges through the bleed ports is recirculated to the inlet space upstream of the leading edges to increase a surge margin of the diffuser.

In another aspect, there is provided a method of increasing a surge margin of a diffuser of a centrifugal compressor for a gas turbine engine, the diffuser including a diffuser case having a plurality of circumferentially distributed angled passage defined therein for receiving fluid from a compressor assembly, the method comprising passively bleeding air from each passage downstream and in proximity of a leading edge of a vane defining said each passage, and passively returning the bled air upstream and in proximity of the leading edge for recirculation through one of the passages.

In a further aspect, there is provided a method of delaying surge conditions of a diffuser for a centrifugal impeller of a gas turbine engine, the diffuser including a diffuser case having an inlet space surrounding an exit of the impeller and a plurality of vanes defining a plurality of angled passages in communication with the inlet space, the method comprising providing a fluid communication distinct from the passages between a first location of each passage located downstream of a leading edge of a respective one of the vanes and a second location located upstream of the leading edge in the inlet space, and using a pressure differential between the first and second locations to urge part of a flow circulating through each passage through the fluid communication for recirculation to reduce the pressure differential, the pressure differential increasing as the surge conditions are approaching.

DESCRIPTION OF THE DRAWINGS

Reference is now made to the accompanying figures in which:

FIG. 1 is a schematic cross-sectional side view of a gas turbine engine;

FIG. 2 is a schematic, partial cross-sectional side view of a centrifugal compressor for a gas turbine engine such as shown in FIG. 1; and FIG. 3 is a schematic front view of part of an impeller assembly and part of a cross-section of a diffuser of the centrifugal compressor of FIG. 2.

DETAILED DESCRIPTION

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 includes at least one centrifugal impeller assembly 20 and a corresponding diffuser 40.

Referring to FIG. 2, the impeller assembly 20 includes an impeller 22 fixed to a central shaft 24 and rotating about a central axis 26 within a stationary impeller shroud 28. The impeller 22 comprises a central hub portion 30 and a plurality of vanes 32 defining the radial periphery of the impeller 22. The impeller vanes 32 redirect the fluid flow by ninety degrees, forcing the flow radially out from the axial inlet, and increase the velocity of the fluid flow. Fluid enters the impeller assembly 20 at leading edges 34 of the impeller vanes 32. The annular fluid path through the impeller assembly 20 is defined by the inner surface 36 of the circumferential impeller shroud 28, and the curved outer surface 38 of the central hub portion 30.

Referring to FIG. 2, the diffuser 40 includes a diffuser case 42 defining a circumferential inlet space 44 surrounding a periphery of the exit 39 of the impeller assembly 20. Although it is not essential, the diffuser case 42 is in one particular embodiment a unitary machined part. Referring to FIG. 3, a series of angled passages 46 are defined through the diffuser case 42 from the inlet space 44, each passage 46 being defined between adjacent diffuser vanes or vane islands 48. In the embodiment shown, each passage 46 is tangential, i.e. it is oriented such that its central axis 50 coincides with a tangent to the periphery of the exit 39 of the impeller assembly 20 or to a circle concentric therewith. Each diffuser vane 48 defines a sharp leading edge 52, and the leading edges 52 extend into the inlet space 44. As such the inlet space 44 includes a semi-vaneless space 54 containing the leading edges 52. The swirling fluid flow exiting the impeller assembly 20 is aligned in the semi-vaneless space 54, before entering the diffuser passages 46. Alternate diffuser geometries are also possible, including for example a diffuser with a vaneless inlet space.

The passages 46 extend from the diffuser case 42, for example in the form of separate passages or pipes 56 connected to the case 42 (see FIG. 1), and are curved such that the working fluid flowing through the diffuser passages 46, 56 is turned back through ninety degrees and expanded, converting the high velocity of the flow into high static pressure.

Each diffuser vane 48 includes a suction surface 58, and at least one bleed port 60 defined in the suction surface 58 in proximity of the leading edge 52. In a particular embodiment, the bleed port 60 is defined between the leading edge 52 and the throat 62 of the corresponding passage 46. Referring to FIG. 2, the diffuser 40 includes an annular manifold 64 in fluid communication with the inlet space 44 just upstream of the leading edges 52 of the diffuser vanes 48. Each diffuser vane 48 includes a conduit 66 defined therethrough extending between the corresponding bleed port 60 and the annular manifold 64, such that fluid communication is provided between each bleed port 60 and the inlet space 44.

As such, air is bled downstream of the leading edge 52 of each diffuser vane 48 through the bleed ports 60, and the bleed flow circulates in the manifold 64. The bleed flow is then reintroduced in the inlet space 44, upstream of the leading edge 52 of the diffuser vanes 48.

In deep choke conditions, the fluid flow accelerates from the impeller exit 39 to the throats 62 of the passages 46. As the pressure at the impeller exit 39 increases, the acceleration of the flow from the impeller exit 39 to the throats 62 is reduced, and the drop in static pressure between the impeller exit 39 and the throats 62 is reduced. The flow acceleration reduces up to the verge of choke where the velocity of the fluid flow from the impeller exit 39 to the throats 62 becomes constant, and the static pressure at the impeller exit 39 and at the throats 62 become similar.

As the fluid flow is further reduced from the verge of choke towards the stall conditions, the incidence of the fluid flow on the diffuser vanes 48 and their leading edge 52 increases. This causes increases in diffusion and static pressure in the semi-vaneless space 54. The static pressure just upstream of the throats 62 thus increases, and the boundary layer upstream of the throats 62 grows. Eventually, the increase of the flow incidence and of the static pressure in the semi-vaneless space 54 results in a stall, followed by stage surge.

As the stall and surge conditions are approaching, the bleed ports 60 circulate a portion of the fluid flow from near or in the throat 62 back to the inlet space 44 through the manifold 64. The bleed flow is thus recirculated to the location just upstream of the leading edges 52, where the static pressure is lower. This recirculation increases the flow at the leading edges 52 and reduces the flow incidence on the diffuser vanes 48. The reduction of the incidence reduces the diffusion downstream of the leading edge 52, which delays local diffusion and separation. The bleeding of part of the flow through the bleed ports 60 helps re-attach the flow while aspirating part of the growing boundary layer. The bleeding and recirculation of part of the fluid flow thus allow for the surge margin to be increased, i.e. the stage surge controlled by the diffuser 40 is delayed.

The bleed ports 60 are positioned downstream of the leading edge 52 such that the flow is extracted from the suction surface 58 on the surge side of the operating point of the centrifugal stage. The operating points of the compressor are understood to define the so-called "run line" of the centrifugal stage. Each operating point has a fixed mass flow and pressure ratio for a given rotational speed of the impeller. The run line is thus determined by the downstream turbine nozzle flow capacity. The nozzle area is chosen such that the operating line, or operating point at a given rotational speed, results is sufficient surge margin and coincides as closely as possible to the peak efficiency of the compressor.

The flow through each bleed port 60 is thus urged by the increased static pressure at or near the throat 62 with respect to the lower static pressure just upstream of the leading edge 52, creating a pressure differential which increases as the surge conditions are approaching. Little or no flow is thus recirculated through the bleed ports 60 during normal operating conditions, thus minimizing the impact of the presence of the bleed ports 60 on the efficiency of the diffuser 40. However, recirculation becomes greater as surge conditions are approaching and the pressure differential between the location of the bleed port 60 at or near the throat 62 and the location in the inlet space 44 just upstream of the leading edge 52 is increased. Surge is delayed by the recirculation of air to the inlet space 44 through the bleed ports 60 and manifold 64. As the portion of the flow being recirculated to the inlet space 44 increases, the pressure differential urging the recirculating flow is decreased and this in turn reduces the portion of the flow being recirculated. As such a passive self-regulating system is provided which delays the apparition of surge conditions.

The manifold of the present diffuser remains simple and yet is aerodynamically advantageous. Ducting the bleed flow from each passage to its vane leading edge is mechanically more complex, but the manifold helps create substantially uniform flow at the diffuser vane leading edge over the entire circumference of the diffuser. This permits flow to be more easily redistributed, thereby producing more axis-symmetric conditions when the individual diffuser passages begin to stall.

The above description is meant to be exemplary only, and one skilled in the art will recognize that changes may be made to the embodiments described without departing from the scope of the invention disclosed. For example, the recirculating bleed ports can be provided in other types of diffusers than that described herein. Recirculation of the flow from the bleed ports to the inlet space can be performed using other types of structures than the manifold described. Still other modifications which fall within the scope of the present invention will be apparent to those skilled in the art, in light of a review of this disclosure, and such modifications are intended to fall within the appended claims.

The invention claimed is:

1. A method of increasing a surge margin of a diffuser of a centrifugal compressor for a gas turbine engine, the diffuser including a diffuser case and a plurality of vanes defining therebetween a plurality of circumferentially distributed angled diffuser passages for receiving gas flow from the centrifugal compressor and an inlet space surrounding an exit of the centrifugal compressor and disposed between said diffuser passages and the centrifugal compressor, the method comprising passively bleeding air from a bleed port in each of said diffuser passages, the bleed port being disposed downstream of a leading edge of the vane defining said diffuser passage and upstream of a throat of said diffuser passage, and passively returning the air bled from the bleed port back into the gas flow at a point upstream of the bleed port and of the leading edge of said vane by reintroducing the bled air into the inlet space for recirculation through said diffuser.

2. The method as defined in claim 1, wherein passively bleeding air downstream and in proximity of the leading edge of the vane is performed in a suction surface of the vane.

3. The method as defined in claim 1, wherein passively bleeding air from each passage downstream and in proximity of the leading edge of the vane is performed upstream of a throat of said each passage.

4. The method as defined in claim 1, wherein passively recirculating the bled air is performed at least partially through each vane.

5. The method as defined in claim 1, wherein the passive bleeding and recirculation is caused by a pressure differential between a first location downstream and in proximity of the leading edge and a second location upstream and in proximity of the leading edge, the pressure differential increasing as surge conditions are approached.

6. A method of delaying surge conditions of a diffuser for a centrifugal impeller of a gas turbine engine, the diffuser including a diffuser case having an inlet space surrounding an exit of the impeller and a plurality of vanes defining a plurality of angled passages in communication with the inlet space, the method comprising providing a bleed flow path distinct from the passages, the bleed flow path extending between a first location and a second location disposed upstream from the first location, the first location being within each passage at a point downstream of a leading edge of a respective one of the vanes forming said passage and upstream of a throat of said passage, and the second location being located in the inlet space upstream of the leading edge, and using a pressure differential between the first and second locations to bleed air off of a flow circulating through each said passage, return said bled air through the bleed flow path and reintroduce the bled air into the inlet space for recirculation through said diffuser to thereby reduce the pressure differential, the pressure differential increasing as the surge conditions are approaching.

7. The method as defined in claim 6, wherein the fluid communication is provided between the first location located in a suction surface of the respective one of the vanes and the second location.

8. The method as defined in claim 6, wherein the fluid communication is provided at least partially through the respective one of the vanes.

\* \* \* \* \*